(12) United States Patent
Mishchenko et al.

(10) Patent No.: US 12,547,480 B2
(45) Date of Patent: Feb. 10, 2026

(54) SCHEMA-BASED INTEGRATION OF EXTERNAL APIS WITH NATURAL LANGUAGE APPLICATIONS

(71) Applicant: OpenAI Opco, LLC, San Francisco, CA (US)

(72) Inventors: Andrey Mishchenko, San Francisco, CA (US); Athyuttam Eleti, San Francisco, CA (US); Paul McMillan, San Francisco, CA (US); David Medina, San Francisco, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/476,944

(22) Filed: Sep. 28, 2023

(65) Prior Publication Data

US 2025/0110811 A1    Apr. 3, 2025

(51) Int. Cl.
| | |
|---|---|
| G06F 9/44 | (2018.01) |
| G06F 9/451 | (2018.01) |
| G06F 9/46 | (2006.01) |
| G06F 9/54 | (2006.01) |

(52) U.S. Cl.
CPC .............. *G06F 9/543* (2013.01); *G06F 9/451* (2018.02)

(58) Field of Classification Search
CPC .................................. G06F 9/543; G06F 9/451
See application file for complete search history.

(56) References Cited

U.S. PATENT DOCUMENTS

| | | | |
|---|---|---|---|
| 8,832,321 B1 * | 9/2014 | Sella | H04L 67/1095 |
| | | | 709/250 |
| 9,588,947 B1 * | 3/2017 | Kraiser | G06F 40/154 |
| 9,971,766 B2 | 5/2018 | Pasupalak et al. | |
| 10,679,631 B2 | 6/2020 | Hirzel et al. | |
| 10,839,432 B1 | 11/2020 | Konig et al. | |
| 10,891,438 B2 | 1/2021 | Singh et al. | |

(Continued)

FOREIGN PATENT DOCUMENTS

| | | | | |
|---|---|---|---|---|
| CN | 110086747 A | * | 8/2019 | |
| CN | 113938382 A | * | 1/2022 | ......... H04L 41/0803 |

(Continued)

*Primary Examiner* — April Y Blair
*Assistant Examiner* — Zhi Chen
(74) *Attorney, Agent, or Firm* — FINNEGAN, HENDERSON, FARABOW, GARRETT & DUNNER LLP

(57) ABSTRACT

Disclosed herein are methods, systems, and computer-readable media for integrating an application programming interface (API) with a natural language model user interface. In one embodiment, a method includes receiving a registration of an external API via a user interface connected to a natural language model, the natural language model being configured to integrate a plurality of external APIs, accessing a manifest file hosted at a first online location by a publisher of the external API, the manifest file comprising parameters for interfacing with the external API and a second online location of a specification associated with the external API, the parameters and second online location being defined by the publisher of the external API, accessing the specification at the second online location, and integrating the external API with the natural language model based on data from at least one of the manifest file or the specification.

19 Claims, 5 Drawing Sheets

(56) References Cited

U.S. PATENT DOCUMENTS

| | | | |
|---|---|---|---|
| 10,951,552 B2 | 3/2021 | Jafar Ali et al. | |
| 11,366,573 B2 | 6/2022 | Roisman et al. | |
| 11,461,311 B2 | 10/2022 | Rodrigues | |
| 11,463,544 B1* | 10/2022 | Peddada | H04L 67/02 |
| 11,797,365 B1* | 10/2023 | Couillard | G06F 9/547 |
| 2007/0011494 A1* | 1/2007 | Xie | G06F 8/41 |
| | | | 714/38.14 |
| 2012/0191803 A1* | 7/2012 | Ray | G06F 21/125 |
| | | | 709/217 |
| 2013/0138622 A1* | 5/2013 | Ayers | G06F 16/40 |
| | | | 715/764 |
| 2014/0047360 A1* | 2/2014 | Kay | G06F 9/451 |
| | | | 715/760 |
| 2015/0264039 A1* | 9/2015 | Fukuda | G06F 21/608 |
| | | | 726/8 |
| 2015/0363171 A1* | 12/2015 | Esfahany | G06F 40/205 |
| | | | 717/106 |
| 2017/0118220 A1* | 4/2017 | Barbara | H04L 63/102 |
| 2019/0370015 A1* | 12/2019 | Vintzel | G06F 21/6281 |
| 2020/0112753 A1* | 4/2020 | Stockhammer | H04N 21/23439 |
| 2020/0301702 A1* | 9/2020 | Singh | G06F 8/73 |
| 2020/0310394 A1* | 10/2020 | Wouhaybi | G05B 19/054 |
| 2020/0349055 A1* | 11/2020 | Reddy | G06F 11/3688 |
| 2021/0099526 A1* | 4/2021 | Lee | H04L 67/143 |
| 2022/0004702 A1 | 1/2022 | Liang et al. | |
| 2022/0058064 A1* | 2/2022 | Ueno | G06F 9/547 |
| 2023/0090079 A1* | 3/2023 | Bruno | G06F 8/423 |
| | | | 717/170 |
| 2023/0239148 A1* | 7/2023 | Maeding | H04L 9/0894 |
| | | | 713/171 |
| 2023/0360388 A1* | 11/2023 | Singh | G06F 11/3438 |
| 2024/0012923 A1* | 1/2024 | Madhur | G06F 9/547 |
| 2024/0320063 A1* | 9/2024 | Wang | G06F 9/541 |
| 2024/0419817 A1* | 12/2024 | Bienkowski | G06F 9/451 |

FOREIGN PATENT DOCUMENTS

| | | | |
|---|---|---|---|
| CN | 115988080 A | * | 4/2023 |
| JP | 2022035126 A | * | 3/2022 |

* cited by examiner

200

```
┌─────────────────────────────────────────────────────────────────┐
│   Receive a re-registration request from an integrated external API │
│                              210                                │
└─────────────────────────────────────────────────────────────────┘
                                 ↓
┌─────────────────────────────────────────────────────────────────┐
│ Determine request to update the natural language model with respect to the │
│                    integrated external API                      │
│                              220                                │
└─────────────────────────────────────────────────────────────────┘
                                 ↓
┌─────────────────────────────────────────────────────────────────┐
│ Access corresponding manifest file and/or specification to identify change(s) and │
│      update the integration of the natural language model and external API │
│                              230                                │
└─────────────────────────────────────────────────────────────────┘
```

*FIG. 2*

SCHEMA-BASED INTEGRATION OF EXTERNAL APIS WITH NATURAL LANGUAGE APPLICATIONS

FIELD OF DISCLOSURE

The disclosed embodiments generally relate to systems, devices, methods, and computer readable media for integrating external application programming interfaces (APIs) with a natural language model.

BACKGROUND

Natural language models, while useful for certain functions, are limited in many ways. For example, natural language models have access only to information from the training data provided to the natural language model. As another example, training natural language models is expensive, and coupled with the fact that training data is often out-of-date and/or must be tailored specifically to one of many potential applications, the cost of training continues to rise while the benefits of the training may remain limited. Furthermore, with regard to external data and applications, natural language models typically can only perform limited, if any, operations relating to the external data or to external applications.

There also exists a need for providing more seamless integration streams for external applications to integrate with machine learning and natural language models, such that the models may access external endpoints in an intelligent fashion based on user input. Current techniques require significant resources and time for integrating applications with machine learning models, which both delays and increases the cost of the integration process to both external application publishers and the proprietors of machine learning models.

The disclosed systems, apparatus, devices, and methods are directed to overcoming these and other drawbacks of existing systems, not limited to those exemplified above. The present disclosure addresses the technical problems with natural language models and provides solutions for improving the accuracy, efficiency, trainability, scalability, and generation of natural language models with respect to external data and applications.

SUMMARY

Embodiments of the present disclosure present technological improvements as solutions to one or more of the above-mentioned technical problems recognized by the inventors in conventional systems.

For example, embodiments of the present disclosure may include a computer-implemented method for integrating an application programming interface (API) with a natural language model, including receiving a registration of an external API via a user interface connected to a natural language model, the natural language model being configured to integrate a plurality of external APIs. Embodiments may also include accessing a manifest file hosted at a first online location by a publisher of the external API. In some embodiments, the manifest file may comprise parameters for interfacing with the external API and/or a second online location of a specification associated with the external API. In some embodiments, the parameters and/or second online location may be defined by the publisher of the external API. Embodiments may also include accessing the specification at the second online location. Embodiments may also include integrating the external API with the natural language model based on data from at least one of the manifest file or the specification.

In some embodiments, the manifest file may comprise authentication data. In some embodiments, the specification may identify at least one endpoint associated with the external API. In some embodiments, the external API may be a third-party software API that provides access to data or functionality not natively available within the user interface or natural language model. In some embodiments, a computer-implemented method may further include accessing updated data within the manifest file or the specification, the updated data reflecting changes made by the publisher of the external API. In some embodiments, the computer-implemented method may include receiving a re-registration of the external API via the user interface based on the updated data. In some embodiments, the specification may comprise descriptions for different users. In some embodiments, the specification may comprise natural language descriptions associated with the external API. In some embodiments, receiving the registration of the external API may comprise receiving authentication data associated with the external API via the user interface. In some embodiments, the computer-implemented method may include receiving, at the natural language model, and based on the manifest file and specification, a description associated with the external API.

Embodiments of the present disclosure may also include a system including at least one memory storing instructions. Embodiments may also include at least one processor configured to execute the instructions to perform operations for integrating an application programming interface (API) into a natural language model, the operations including receiving a registration of an external API via a user interface connected to a natural language model, the natural language model being configured to integrate a plurality of external APIs, accessing a manifest file hosted at a first online location by a publisher of the external API, the manifest file comprising parameters for interfacing with the external API and/or a second online location of a specification associated with the external API, wherein the parameters and/or second online location may be defined by the publisher of the external API, accessing the specification at the second online location, and/or integrating the external API with the natural language model based on data from at least one of the manifest file or the specification.

Embodiments of the present disclosure may also include a computer networking apparatus including one or more memories, one or more network devices, and/or one or more processors connected to the one or more memory devices and the one or more network devices. In some embodiments, the one or more processors may be configured to receive a registration of an external API via a user interface connected to a natural language model, the natural language model being configured to integrate a plurality of external APIs, access a manifest file hosted at a first online location by a publisher of the external API, the manifest file comprising parameters for interfacing with the external API and/or a second online location of a specification associated with the external API, wherein the parameters and/or second online location may be defined by the publisher of the external API, access the specification at the second online location, and/or integrate the external API with the natural language model based on data from at least one of the manifest file or the specification.

Other systems, methods, and computer networking apparatuses are also discussed within this disclosure.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2 illustrates an exemplary method for updating an integration of an API with a natural language model user interface according to some embodiments of the present disclosure.

DETAILED DESCRIPTION

Figure 1:
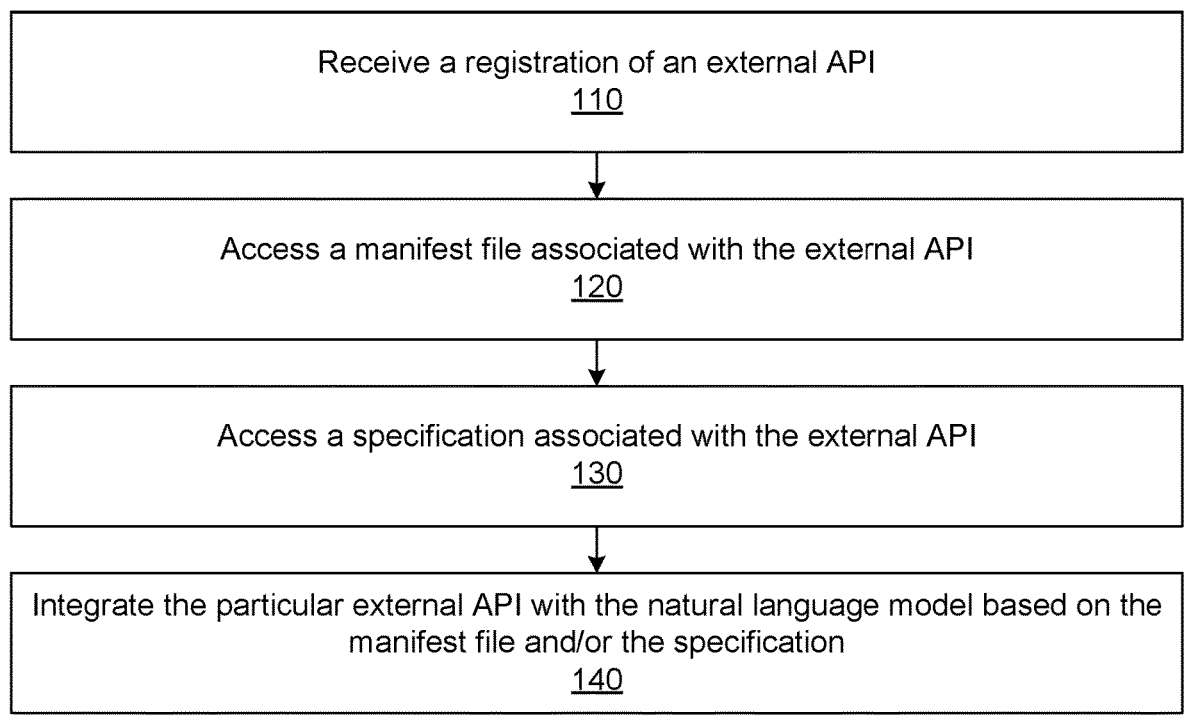
FIG. 1 illustrates an exemplary method for integrating an API with a natural language model user interface according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Augmenting natural language models so that they can interact automatically, accurately, and safely with external tools is a complex technical problem. Applications based solely on a user input solves the problems described above and enable the production of sophisticated natural language models and associated with external systems. The solutions described herein enable natural language models to receive and readily use, in addition to any training data, information that is most recent and most specific as provided by a publisher of an external tool or application. Via documentation which can be published by such publishers, and in combination with standard documentation available online, natural language models may be enabled to harvest data (e.g., available online) to understand the functions available to them in interacting with an API associated with the external tool or application. In turn, the natural language model may take both safe, valid, and constrained actions with respect to a tool or application external to the model on behalf of a user interacting with the natural language model. Furthermore, the model may then provide a resulting output from the external tool or application to the user, all without the user needing to access the external tool or application on their own. Moreover, all of this may be performed without any involvement from users, developers, or administrators associated with the natural language model or associated systems. This also allows managers of the tool or application to change it without using or interacting with the model, and with the model still being able to use the tool or application without requiring reconfiguration.

Connecting natural language models to external tools and applications introduces new opportunities including increasing the safety of natural language models and systems associated therewith, allowing users to interact with various external tools and applications via a single natural language model user interface, verifying sources and information that the natural language model draws upon, reducing inaccuracies resulting from multiple user interfaces and/or API access points, and improving interoperability between natural language models and other applications.

As an example, if a publisher of an external tool or application desires to allow that external tool or application to be accessible by (and thus integratable with) a natural language model via an API associated with the external tool or application, the publisher may follow one or more of the following steps (without requiring any additional interaction or involvement of any user associated with the natural language model):

1. Create an API with endpoints configured to be called by a natural language model or an associated system (e.g., an existing developer API or a wrapper around an existing API);
2. Write a specification documenting the created API and a manifest file that includes the location of the specification and additional metadata usable for training the natural language model (e.g., explanations of functions or parameters available with the tool or application). The description may be formatted as a standard specification or a system associated with the natural language model may generate a standard specification (e.g., a generated description) based on server definition code or other input provided by the publisher;
3. Register the API with the natural language model (e.g., via a user interface associated with the natural language model), providing at least a location of the manifest file; and
4. Given the API documentation (e.g., the manifest file and the specification location provided in the manifest file) and the context of a conversation with a user via a user interface of the natural language model, the natural language model(s) and associated system(s) may be configured to automatically determine the parameters needed to invoke the publisher-created API in order to fulfill a user intent or request as indicated by the user's input.

Disclosed systems and methods improve the technical field of integrating machine learning models with external applications by automating and thereby simplifying the process required to integrate and update external application plugins. Disclosed systems and methods further improve the technical field by incorporating natural language model capabilities within the integration process, thereby allowing for integration information to be provided to the natural language model via programming code in any number of formats, documentation, and/or natural language input. Disclosed systems and methods also improve the functioning of computers by providing an integration platform that allows for scalability, automation, efficiency, and increased relevancy of machine learning model output (e.g., based on an intended result).

Illustrative embodiments of the present disclosure are described below.

FIG. 1 is a flowchart that describes a computer-implemented method 100 for integrating an application programming interface with a natural language model user interface, according to some embodiments of the present disclosure. The process shown in FIG. 1, or any of its constituent steps, may be implemented using an operating environment 400 (further discussed in connection with FIG. 4), a system 500 (further discussed in connection with FIG. 5), or any component thereof. The steps illustrated in FIG. 1 are exemplary and steps may be added, merged, divided, duplicated, repeated (e.g., as part of a machine learning process), modified, performed sequentially, performed in parallel, and/or deleted in some embodiments.

In some embodiments, at 110, the computer-implemented method may include receiving a registration of an external API via a user interface connected to a natural language model, the natural language model being configured to integrate a plurality of external APIs. A user interface may refer to a software interface that allows users to interact with a natural language model using natural language inputs and receiving at least natural language outputs. A user interface may enable users to communicate with the natural language model in a more human-like manner, making it easier to perform tasks, ask questions, and receive information in response to input. A user interface may include, e.g., a text-based interface, a voice-activated interface, a conversational interface, a command-line interface, a web interface, a virtual reality or augmented reality interface, a mobile application interface, or an email or text message interface.

A registration may refer to information associated with the external API which may indicate a request to integrate the external API with the natural language model user interface. Such information may include, e.g., access credentials (e.g., API key, access token, client ID, or other authentication or authorization data), information relating to the use of the external API (e.g., permission data, usage limit data, service data), personal or organizational information associated with the external API, other documentation associated with the external API, and/or an integration request made by a publisher of the external API. For example, a registration may be received via a user input (e.g., input at an input/output device 418). A user input may include, e.g., at least one of a natural language input, an indication of a desired external API for integration, or a selection of a desired external API for integration. For example, a user may enter text comprising an integration request (e.g., into a chat window also configured to display natural language model output or into a search bar), provide a selection of a user interface element (e.g., from within a displayed menu), perform a click-and-drag operation, or perform any other action with an input device that provides an input and/or indication of a request to integrate an external API with the natural language model.

Referring further to FIG. 1, at 120, exemplary embodiments of the computer-implemented method 100 may include accessing a manifest file hosted at a first online location by a publisher of the external API. A manifest file may refer to a configuration file that provides information about the structure, dependencies, compatibility, and/or metadata of a software and/or hardware associated with the external API. In some embodiments, a manifest file may be a text file, a spreadsheet file (e.g., XLS, CSV), a markup language file (e.g., JSON, YAML, XML, TOML), a hypertext markup file (e.g., HTTP), or a specialized or custom manifest file. An online location may refer to a specific place or address on the internet where digital content is accessible. An online location may be the unique address or URL (Uniform Resource Locator) that points to a particular website, web page, file, or resource that can be accessed through a web browser or other online tools. The received registration may include a natural language input indicating a particular external API or service (e.g., a name of an API or service or digital marker identifying a particular external API or service). If the registration is received via a natural language input, identifying the particular external API may include parsing the natural language input to determine a desired external API (e.g., by detecting a keyword associated with the desired external API). As another example, the received registration may include a non-natural language input indicating an external API or service (e.g., a selection of an API or service identifier from a menu or search bar, an input of a Uniform Resource Locator, or URL, an input of a Uniform Resource Identifier, or URI, a command line interface input, a developer input). If the registration is received via a selection or a command line interface input, identifying the external API may be determined, e.g., directly based on the received input.

Accessing the manifest file may include, e.g., accessing, via a system associated with the natural language model user interface, a manifest file provided by a publisher associated with the external API. The manifest file may describe AI- or model-specific properties related to the corresponding external API. In some embodiments, a manifest file may be hosted and stored (i.e., located) in a location associated with the particular external API (e.g., a website, domain, or application associated with the particular external API). A host (e.g., server, storage device) of the manifest file may be distinct from (e.g., remote from and/or uncontrolled by) a host of the natural language model and/or natural language model user interface. In some embodiments, the manifest file may be accessed using a known URL.

In some embodiments, the manifest file may be customizable by a publisher (e.g., management device or system) of the third-party software API. In some embodiments, a manifest file may be editable (i.e., customizable) by a publisher associated with a particular external API or service. In some embodiments, the manifest file may not be editable by a system or user associated with (e.g., hosting or running) the natural language model user interface and/or the natural language model.

In some embodiments, the manifest file may comprise parameters for interfacing with the external API. In some embodiments, the parameters may be defined by the publisher of the external API.

In some embodiments, the manifest file may also comprise a second online location of a specification associated with the external API. In some embodiments, the second online location may be defined by the publisher of the external API. In some embodiments, the location of the web API, the location of the description of the web API, or both locations may be indicated in a corresponding manifest file.

In some embodiments, a system associated with the natural language model may validate the manifest file. Validating may include determining whether specific fields in the manifest file meet certain requirements for the natural language model. Such requirements may include, e.g., that the URL provided for the specification (e.g., as provided in a "api.url" parameter) must be hosted at the same level or a subdomain of the root domain associated with the external API, that a second-level domain of a URL provided (e.g., as provided in a "legal info" parameter) must be the same as the second-level domain of the root domain associated with the external API, and/or that a second-level domain of an email address (e.g., as provided in a "contact_info" parameter) should be the same as the second-level domain of the root domain associated with the external API.

In some embodiments, and referring further to FIG. 1, at 130, the computer-implemented method 100 may include accessing the specification at the second online location. In some embodiments, the specification may be hosted by a publisher of the third-party software API. In some embodiments, accessing the specification may include accessing a web API and/or a description of the web API. A web API may be, e.g., a Hypertext Transfer Protocol (HTTP) API, a Python API, or a REST (Representational State Transfer) API. A description of the web API may be provided in the specification or at another online location. A specification may refer to a document or description that outlines the rules, protocols, methods, and data structures required for interacting with the external API. For example, a specification may contain information related to specific endpoints associated with the external API, HTTP methods accepted by the external API, request and response formats associated with the external API, authentication and/or authorization data, data structures associated with the external API, error handling information, rate limiting information, versioning data, explanations of endpoints and parameters, example requests and responses, code snippets in various programming languages, and/or sample use cases.

In some embodiments, a specification may contain descriptions for different users. For example, a specification may contain different descriptions for users having a subscription to a service of the external API and users who do not (e.g., those attempting to use a free version of the service). The two descriptions may include varying information, based on the subscription level of a user and corresponding functionalities within the service. As another example, a specification may contain different descriptions for returning users and new users. The two descriptions may include varying information, based on a user history. In some embodiments, a specification may be a text file, a spreadsheet file (e.g., XLS, CSV), a markup language file (e.g., JSON, YAML, XML, TOML), a hypertext markup file (e.g., HTTP), or a specialized or custom specification file or folder.

In addition to expressive, informative names for each field, the specification may also contain natural language description fields for attributes listed therein. The natural language description fields may be used, e.g., to provide natural language descriptions of what a function does or what information a query field expects. For example, description fields may include natural language relating to intended functionality of certain code within the specification, expected results of certain code within the specification, information relating to the motivation for including certain code in the specification, and other explanatory information in a natural language format. The natural language model is in turn able to access and process the description fields, which may guide the model in understanding the specification and/or accessing the external API. The description fields thereby give publishers of external APIs the freedom to instruct the model on how to use the external API generally. The natural language model is highly capable of understanding natural language and following instructions; therefore, the description fields may provide general instructions on what the external API does and how the model should use the information provided in the specification.

A specification may also serve as a contract between the publisher of the external API (e.g., the server or service) and the consumer (e.g., a user or client application) by defining how requests and responses should be structured and processed. A specification may be formatted according to, e.g., a proprietary standard or any open standard for describing a web API. In some embodiments, a manifest file, a corresponding web API, and a corresponding description of the web API may all be hosted by a publisher of the external API. In some embodiments, the specification may include descriptions (including, e.g., parameters and description fields) for different users or user types.

In some embodiments, a system associated with the natural language model may automatically translate server definition code received from a publisher of an external API and generate a description or specification for the external API, based on the automatic translation, to the natural language model or user interface. Translating may refer to analyzing the server definition code and extracting relevant information to generate the specification. Translating may include parsing the server definition code to understand the structure of the server definition code (e.g., endpoints, parameters, methods, data structures). Translating may also include identifying and extracting API endpoints from the server definition code, identifying HTTP methods associated with each identified API endpoint and the routes (e.g., URL paths) at which the identified methods may be accessed, extracting input parameters for making requests (e.g., query parameters, headers, request body) and output parameters returned by the API endpoints (e.g., response body, headers), extracting data validation logic or data type definitions (e.g., required fields, allowed values, data formats), extracting annotations or comments (e.g., metadata), extracting authentication and authorization data, extracting error handling information, and/or extracting definitions of data structures or models used by the external API (e.g., fields, types, relationships).

Based on the identifying and extracting, the system may generate a description or specification for the external API. In some embodiments, the system may further generate interactive documentation and code examples from server definition code, the manifest file, and/or the specification provided by the publisher. In some embodiments, the system may allow a publisher of the external API to further review and adjust the generated description or specification to accurately represent the intended behavior of the external API. The natural language model user interface or the natural language model may receive the generated description or specification in place of, or in addition to, the server definition code.

In some embodiments, the natural language model user interface may be communicably connected to a natural language model. In some embodiments, the natural language model may be trained to call one or more functions (e.g., based on the manifest file, specification, and/or in response to a received user input), as described and exemplified elsewhere herein.

In some embodiments, and referring further to FIG. 1, at 140, the computer-implemented method 100 may include integrating the external API with the natural language model based on data from at least one of the manifest file or the specification. In some embodiments, information from the manifest file, the specification, and/or the generated description may be injected as a compact description in a communication to the natural language model which is not visible to a user via the natural language model user interface.

In some embodiments, a plugin causing the natural language model to be communicably coupled to a particular external API may be generated based on the received registration information (e.g., in response to an integration request received by at least one processor), the manifest file data, and the specification. Generating the plugin may include initiating a plugin service that allows a natural language model user interface (or an associated program) to electronically communicate with an external API. The plugin service may, e.g., determine the particular external API based on the registration, access the corresponding manifest file, scrape the corresponding manifest file, determine a location of a specification for the external API based on the scraping, access the specification for the external API, and/or scrape the accessed specification. The accessed specification may include specific functionalities, rather than the full functionality, associated with the external API (e.g., those functionalities that a publisher of the external API desires to expose to the natural language model). In some embodiments, the natural language model may be operated from within a web client (e.g., a web client communicably and electronically connected to the natural language model). In some embodiments, the same web client (or a different web client) may be used to transmit and/or receive digital information to or from an integrated external API, consistent with disclosed embodiments.

In some embodiments, the natural language model user interface may be communicably connected to a natural language model configured to recognize and interpret user input (e.g., natural language messages) and external API payloads. For example, the natural language model may be trained (e.g., using input data reflecting user input and/or external API payloads, using feedback or validation data associated with correct results) to understand a request implicit or explicit in natural language input and an associated function or other tool associated with responding to the request. In some embodiments, the natural language model may be associated with a chatbot (e.g., the natural language model user interface may include a chatbot). In some embodiments, the external API may be a third-party software API that provides access to data or functionality not natively available within a system associated with (e.g., hosting) the natural language model and/or the natural language model user interface.

In some embodiments, the computer-implemented method may include accessing the particular external API based on input at the natural language model user interface. For example, after 140, method 100 may include accessing the particular external API which may include requesting access to the particular external API, electronically communicating with the particular external API, generating digital information to transmit to the particular external API, translating digital information to transmit to the particular external API, transmitting data to the particular external API, and/or receiving digital information (e.g., a result) from the particular external API.

In some embodiments, the computer-implemented method may include transmitting, based on the accessing, a response message (e.g., based on a result from the particular external API) to the natural language model user interface. For example, after 140, method 100 may include transmitting a response message. In some embodiments, the response message may include a result of (e.g., based on) the accessing of the particular external API. In some embodiments, transmitting the response message to the user may include summarizing payload contents received from the particular external API and generating (e.g., using the natural language model) and displaying natural language text (e.g., based on the payload contents) to the user via the natural language model user interface.

For example, a result of the accessing of the particular external API may include receiving an output from the particular external API via a web API endpoint. The output may be, e.g., a payload or other machine-readable data provided by an external application via the particular external API. The payload may be, e.g., a JavaScript Object Notation (JSON), YAML, or other markup language payload. In some embodiments, the machine-readable data may include rich text or image data, streaming data, user interface affordance data (e.g., buttons), and machine-learned data. In some embodiments, the machine-readable data may be provided to the natural language model, and in turn, the natural language model may translate and summarize the contents of the machine-readable data to a user via the natural language model user interface (e.g., by outputting natural language text generated by the model). As another example, a result of the accessing of the particular external API may further include the execution of a function within an external application, and thereafter receiving an output from the particular external API indicating that the function was successfully executed. In some embodiments, output based on the particular external API may be provided within the natural language model (e.g., a module communicably linked to the particular external API, a generated URL configured to access the particular external API, rich text and/or images, streaming data, special user interface graphics such as buttons, etc.). Similarly, while the natural language model may receive machine-readable data from the particular external API, e.g., as a payload, the natural language model may, in turn, translate and summarize that data and provide to a user, via the natural language model user interface, a natural language response based on the received output.

Some non-limiting practical application examples of method 100, and the general disclosure more broadly, are provided below. In some embodiments, if a particular external API is hosted at the domain, "example.com," the manifest file associated with the particular external API may be located at the URL, "example.com/well-known/ai-plugin.json," and the specification may be located at the URL, "example.com/proprietaryapi.json," as indicated in the manifest file. Alternatively, the specification may be written in other formats, such as, e.g., YAML, RAML (RESTful API Modeling Language), JSON, WSDL (Web Services Description Language), WADL (Web Application Description Language), GraphQL SDL (Schema Definition Language), or API Blueprint. In turn, a natural language model may access (e.g., scrape) the manifest file and/or specification corresponding to a particular external API, as provided by a publisher of the particular external API, and utilize these documents to inform (e.g., through a training process) the natural language model as to call functions available to the natural language model when interacting with the particular external API, and how to use those call functions to achieve particular results (e.g., results responsive to a natural language input).

In some embodiments, method 100 may also include generating digital information and accessing an integrated API. For example, in response to a conversation with a user, a natural language model and/or associated system may generate digital information and access an integrated external API. For example, a natural language model and/or associated system may generate a shopping list and access an integrated external API in order to generate an online shopping cart including items from the shopping list, edit the online shopping cart, and place an order for the user, via an external application as chosen by the user. As another example, in some embodiments, in response to a conversation with a user (e.g., including through interpreting digital natural language input), a natural language model and/or associated system may, based on instructions received from the user, access an integrated external application containing a database of curated data and computation capabilities, deliver accurate and up-to-the-minute answers for a wide range of questions, and thereby enhance conversational workflows. As yet a further example, in some embodiments, in response to a conversation with a user (e.g., including through interpreting digital natural language input), a natural language model and/or associated system may, based on instructions received from the user, automate tasks for the user across one or more integrated external applications (e.g., replying to emails, locating data in a file or a database, or editing documents, all without the user needing to directly or indirectly access the one or more integrated external APIs associated with the one or more external applications.

FIG. 2 is a flowchart that further describes an exemplary computer-implemented method 200 for re-registering an integrated external API (e.g., the external API from FIG. 1), according to some embodiments of the present disclosure. The process shown in FIG. 2 or any of its constituent steps may be implemented using operating environment 400, system 500, or any component thereof. The steps illustrated in FIG. 2 are exemplary and steps may be added, merged, divided, duplicated, repeated (e.g., as part of a machine learning process), modified, performed sequentially, performed in parallel, and/or deleted in some embodiments.

In some embodiments, at 210, method 200 may include receiving a re-registration request from a publisher of the external API. A re-registration request may include information similar to that of a registration or integration request. Alternatively, a re-registration request may include information indicating that changes have been made to the functionality of the external API (e.g., as shown in a corresponding manifest file and/or specification).

At 220, method 200 may include determining the re-registration request includes a request to update the natural language model with respect to the integrated external API, e.g., based on a change made by the publisher of the external API to a corresponding manifest file and/or specification.

At 230, method 200 may include accessing the corresponding manifest file and/or specification to identify the change(s) made by the publisher of the external API, and updating the integration between the external API and the natural language model based on the identified change(s).

Figure 3:
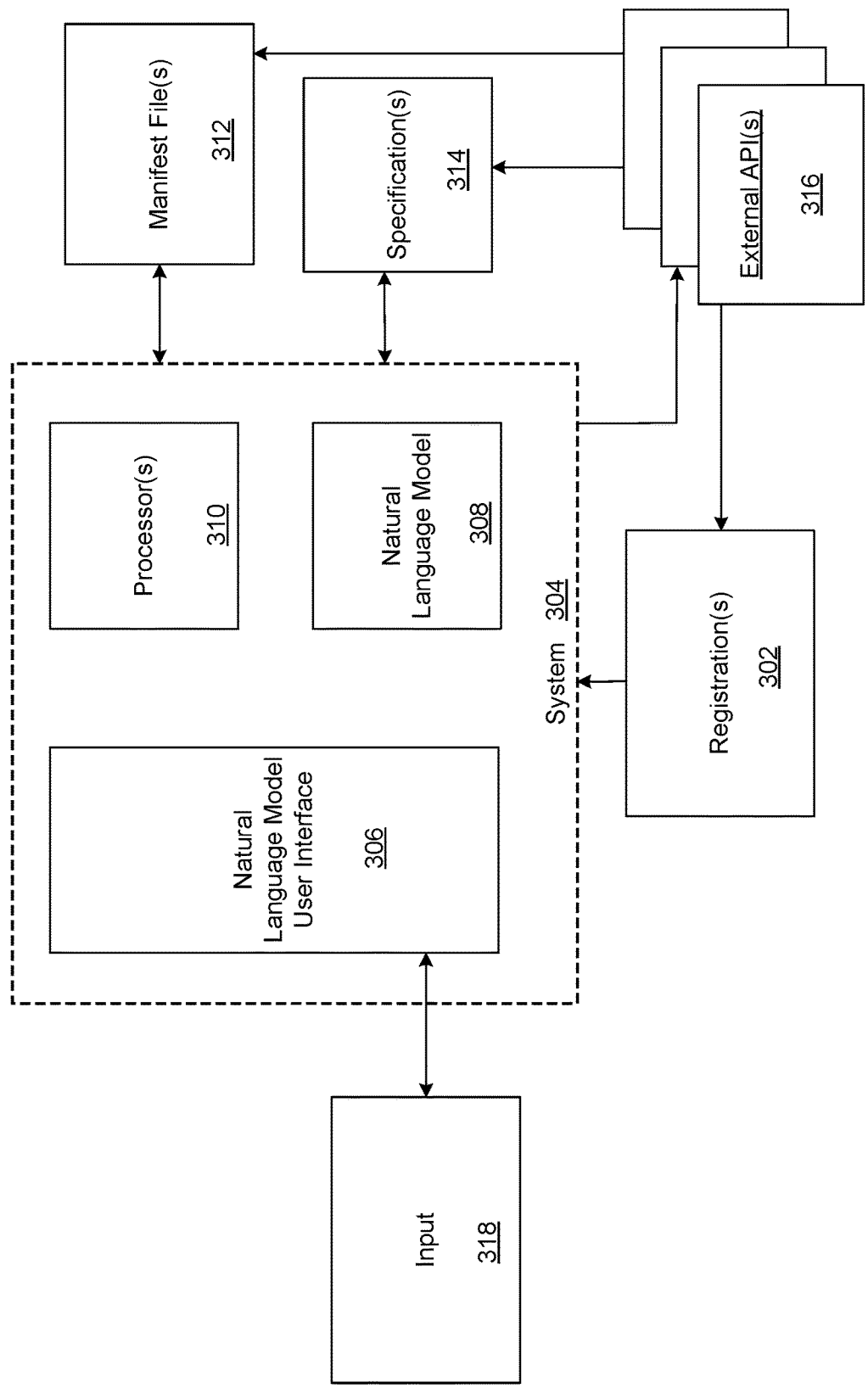
FIG. 3 is an exemplary block diagram according to some embodiments of the present disclosure.

FIG. 3 is a block diagram that describes an exemplary operating environment 300 for implementing the method of FIGS. 1 and 2 and for integrating one or more external APIs with a natural language model and/or a natural language model user interface, according to some embodiments of the present disclosure.

In some embodiments, operating environment 300 may include system 304 comprising at least one memory storing instructions (not shown), at least one processor 310 configured to execute the instructions to perform a set of operations for integrating an application programming interface (API) of a plurality of external APIs 316 into a natural language model user interface 306. The set of operations may include the steps of method 100 described herein. As such, system 304 may be configured for receiving a registration 302 of an external API via a user interface connected to natural language model 308, natural language model 308 being configured to integrate a plurality of external APIs 316.

In some embodiments, system 304 may be a single device (e.g., computer device 402) or multiple devices. System 304 may further be configured for determining registration 302 includes a request to integrate the external application programming interface (API) with natural language model user interface 306. System 304 may also be configured for identifying the particular external API based on the received registration 302. Further, system 304 may be configured for integrating the particular external API with natural language model user interface 306. System 304 may also be configured for accessing a manifest file 312 hosted at a first online location by a publisher of the external API 316, manifest file 312 comprising parameters for interfacing with external API 316, and a second online location of a specification 314 associated with external API 316, the parameters and second online location being defined by the publisher of external API 316. System 304 may further be configured for accessing specification 314 at the second online location. System 304 may also be configured for integrating external API 316 with natural language model user interface 306 based on data from at least one of manifest file 312 or specification 314.

In some embodiments, and further referring to FIG. 3, operating environment 300 may include an input 318 which is received at natural language model user interface 306 of system 304, wherein input 318 includes a request by a user of the natural language model user interface. In some embodiments, the request by a user may indicate a user-desired external API. In some embodiments, natural language model 308 and/or system 304 may identify the user-desired external API and access information within one or more manifest files 312 associated with the identified external API 316. In some embodiments, natural language model 308 and/or system 304 may identify one or more web APIs and/or specifications of external web API(s) 316 and access information within the one or more specifications of the web API(s).

In some embodiments, system 304 may access the user-desired external API 316 based on the integration of the external API 316 and natural language model 308 or natural language model user interface 306. As an example, one or more processors 310 may receive a call function generated by the natural language model, based on the information provided in manifest file(s) 314 and/or specification(s) 316, and translate that call function to a web request, via processor(s) 310, to be transmitted by system 304 to an external API 316. In turn, external API 316 may cause a functionality in an application associated with external API 316 and/or transmit a response to the web request back to system 304. In some embodiments, system 304 may transmit, based on the accessing, an output (e.g., a response message) via natural language model 308 and/or natural language model user interface 306 in response to input 318. For example, the response message may include a result of the accessing of external API 316 based on input 318.

In some embodiments, natural language model 308 may be configured to generate a function call to receive digital information, which may be used by model 308 to generate an output, consistent with disclosed embodiments. A function call may refer to an act of invoking or executing a function within a program. A function may refer to one or more blocks of programming code designed to perform specific tasks or computations. Generating a function call may refer to an act of requesting the natural language model (or associated system) to execute the one or more blocks of programming code to perform one or more specific tasks or computations. Non-limiting examples of function calls include requesting connectivity with external API 316, requesting information from external API 316, modifying data via external API 316, and/or transmitting data to external API 316. In some embodiments, the function call generated by natural language model 308 may be converted (e.g., by natural language model 308 or a program, application, script, or module) into an API call, which may be configured to be interpretable by the particular external API 316.

In some embodiments, natural language model user interface 306 may receive authentication parameter input (e.g., a third input, such as a username and password), which may enable natural language model 308 or system 304 to access particular digital information associated with the particular external API 316 and/or user (e.g., personal user data). In some embodiments, natural language model 308, system 304, or user interface 306 may determine that a selected external API requires authentication to perform one or more operations and/or may prompt a user device for authentication parameter input (e.g., at natural language model user interface 306).

According to some embodiments, natural language model 308 may be trained to call functions in response to user input. For example, natural language model 308 may be provided, in the model's system prompt, with a description of functions specific to one or more particular APIs 316 via the manifest file. From the description of functions, natural language model 308 may select one or more of the functions which it may determine based on the user-desired external API, a natural language input 318 from a user of natural language model user interface 306, and information scraped from manifest file 312 and/or specification 314 of the web API (e.g., according to associations learned through training). Therefore, accessing particular external API 316 may include generating one or more call functions based on input 318. In turn, the one or more call functions may be translated into one or more actions or web requests (e.g., one or more HTTP requests) which may be executable by a system (e.g., processor 310) associated with natural language model 308 or system 304. In some embodiments, the one or more functions may be translated into one or more requests to be executed by at least one processor (e.g., processor 310) associated with natural language model, user interface 306, or system 304.

The training of natural language model 308 may be supervised or unsupervised, consistent with disclosed embodiments. In some embodiments, training of natural language model 308 may be supervised or influenced by an entity (e.g., publisher, manager, or host device) associated with a particular external API 316. Furthermore, a system (e.g., system 304) associated with natural language model 308 may then convert the call functions generated by natural language model 308 into actions to be taken over a communication protocol (e.g., HTTP), thereby generating requests to particular external API 316. As a result, a publisher of particular external API 316 wishing to integrate particular external API 316 with natural language model 308 may share, as part of a registration or integration request, a web domain where a corresponding manifest file is hosted. In some embodiments, the publisher may share only the domain name because the manifest file may be located in a known location within that domain. In turn, a natural language model (e.g., natural language model 308) receiving the domain name, either directly from a publisher or via user interface 306, may facilitate interactions between a user of natural language model 308 and the particular external API 316. Thus, by providing the training data and descriptive information via a shareable manifest file, disclosed embodiments significantly reduce the additional work that publishers of external APIs must do to support integrations of an external API across any number of natural language models. This also reduces demand on computing resources. Similarly, disclosed embodiments also allow for a single natural language model (e.g., natural language model 308) to access and utilize any number of different and separately managed external APIs. Moreover, disclosed embodiments allow for the updating of an integrated external API when the shareable manifest file is edited and the particular external API is redeployed (re-registered), because natural language model 308 may be configured to periodically access and scrape the manifest file and the corresponding specification thereby receiving any updates made by a publisher of the particular external API, as reflected in the corresponding manifest file and/or specification.

According to another embodiment of the present disclosure, a computer networking apparatus comprising one or more memory devices, one or more network devices, and/or one or more processors connected to the one or more memory devices and the one or more network devices, wherein the one or more processors are configured to perform instructions. The steps embodied in the instructions may include the steps of method 100 described herein. As such, the one or more processors may be configured to receive a registration of an external API via a user interface connected to a natural language model, the natural language model being configured to integrate a plurality of external APIs. The one or more processors may further be configured to access a manifest file hosted at a first online location by a publisher of the external API, the manifest file comprising parameters for interfacing with the external API, and/or a second online location of a specification associated with the external API, the parameters and second online location being defined by the publisher of the external API. The one or more processors may further be configured to access the specification at the second online location. Further, the one or more processors may further be configured to integrate the external API with the natural language model based on data from at least one of the manifest file or the specification.

Figure 4:
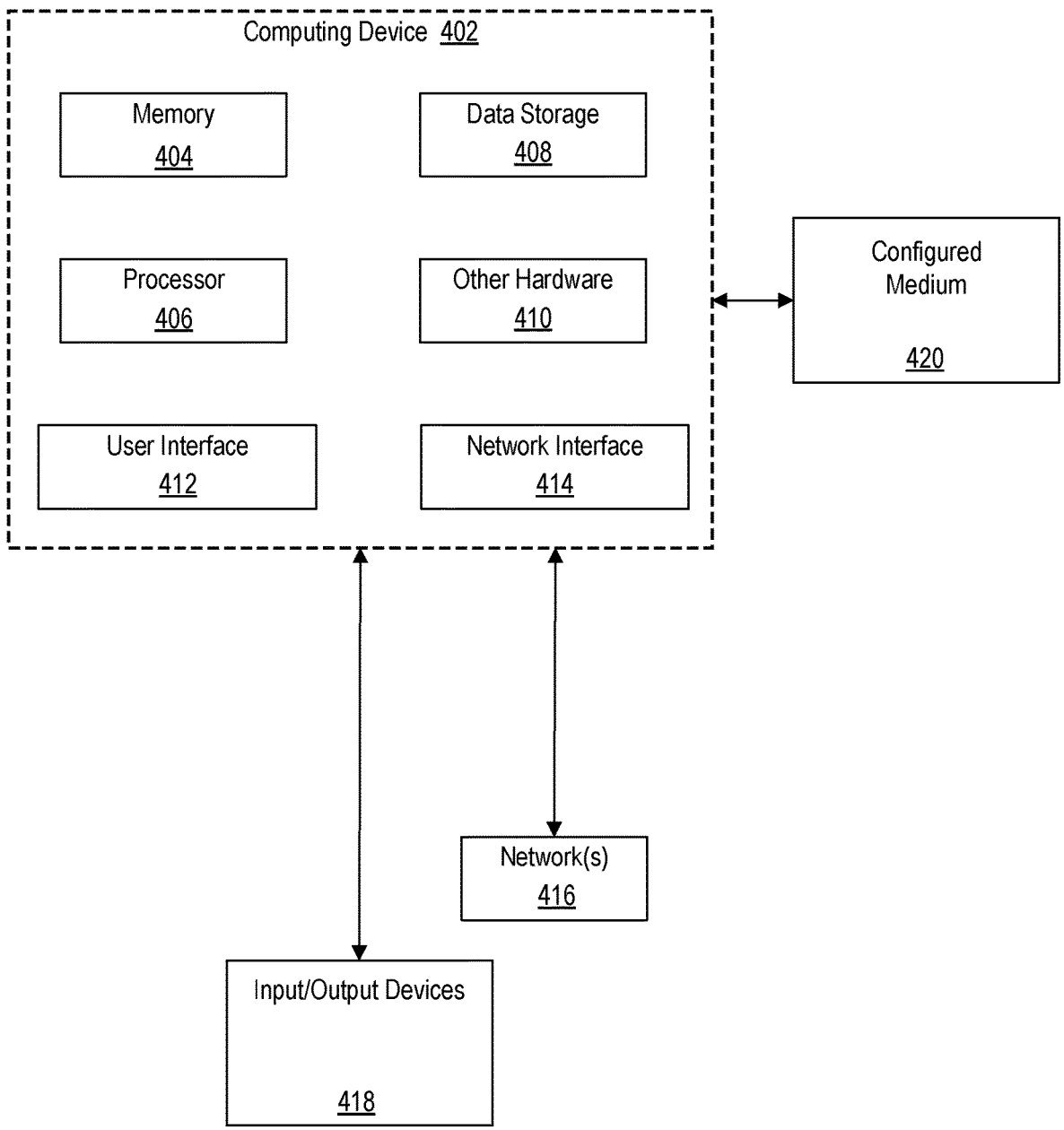
FIG. 4 is a block diagram illustrating an exemplary operating environment for implementing various aspects of this disclosure, according to some embodiments of the present disclosure.

An exemplary operating environment for implementing various aspects of this disclosure is illustrated in FIG. 4. As illustrated in FIG. 4, an exemplary operating environment 400 may include a computing device 402 (e.g., a general-purpose computing device) in the form of a computer. In some embodiments, computing device 402 may be associated with a user. Components of the computing device 402 may include, but are not limited to, various hardware components, such as one or more processors 406, data storage 408, a system memory 404, other hardware 410, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 4, an operating environment 400 for an exemplary embodiment includes at least one computing device 402. Computing device 402 may be a uniprocessor or multiprocessor computing device. Operating environment 400 may include one or more computing devices (e.g., multiple computing devices 402) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 402 may be configured for end-users, e.g., with applications, for administrators, as a server, as a distributed processing node, as a special-purpose processing device, or otherwise configured to train machine learning models and/or use machine learning models. In some embodiments, multiple computing devices 402 (e.g., a network of GPUs) may be configured to train a machine learning model.

One or more users may interact with the computer system comprising one or more computing devices 402 by using a display, keyboard, mouse, microphone, touchpad, camera, sensor (e.g., touch sensor) and other input/output devices 418, via typed text, touch, voice, movement, computer vision, gestures, and/or other forms of input/output. An input/output device 418 may be removable (e.g., a connectable mouse or keyboard) or may be an integral part of the computing device 402 (e.g., a touchscreen, a built-in microphone). A user interface 412 may support interaction between an embodiment and one or more users. A user interface 412 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 418 and computing device 402, based on input received at user interface 412 and/or from network(s) 416. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 402 in other embodiments, depending on their detachability from the processor(s) 406. Other computerized devices and/or systems not shown in FIG. 4 may interact in technological ways with computing device 402 or with another system using one or more connections to network 416 via a network interface 414, which may include network interface equipment, such as a physical network interface controller (NIC) or a virtual network interface (VIF).

Computing device 402 includes at least one logical processor 406. The at least one logical processor 406 may include circuitry and transistors configured to execute instructions from memory (e.g., memory 404). For example, the at least one logical processor 406 may include one or more central processing units (CPUs), arithmetic logic units (ALUs), Floating Point Units (FPUs), and/or Graphics Processing Units (GPUs). Computing device 402, like other suitable devices, also includes one or more computer-readable storage media, which may include, but are not limited to, memory 404 and data storage 408. In some embodiments, memory 404 and data storage 408 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 420 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 402, making its content accessible for interaction with and use by processor(s) 406. Removable configured medium 420 is an example of a computer-readable storage medium. Some other examples of computer-readable storage media include built-in random access memory (RAM), read-only memory (ROM), hard disks, and other memory storage devices which are not readily removable by users (e.g., memory 404).

Configured medium 420 may be configured with instructions (e.g., binary instructions) that are executable by processor 406; "executable" is used in a broad sense herein to include machine code, interpretable code, bytecode, compiled code, and/or any other code that is configured to run on a machine, including a physical machine or a virtualized computing instance (e.g., a virtual machine or a container). Configured medium 420 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 406, memory 404, data storage 408, and screens/displays, operating environment 400 may also include other hardware 410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 418 such as human user input/output devices (screen, keyboard, mouse, tablet, microphone, speaker, motion sensor, etc.) will be present in operable communication with one or more processors 406 and memory.

In some embodiments, the system includes multiple computing devices 402 connected by network(s) 416. Networking interface equipment can provide access to network(s) 416, using components (which may be part of a network interface 414) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

Computing device 402 may operate in a networked or cloud-computing environment using logical connections to one or more remote devices (e.g., using network(s) 416), such as a remote computer (e.g., another computing device 402). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 402 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 402 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

Data storage 408 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 408 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 4, operating environment 400 may include at least one computing device 402, the at least one computing device 402 including at least one processor 406, at least one memory 404, at least one data storage 408, and/or any other component discussed above with respect to FIG. 4.

Figure 5:
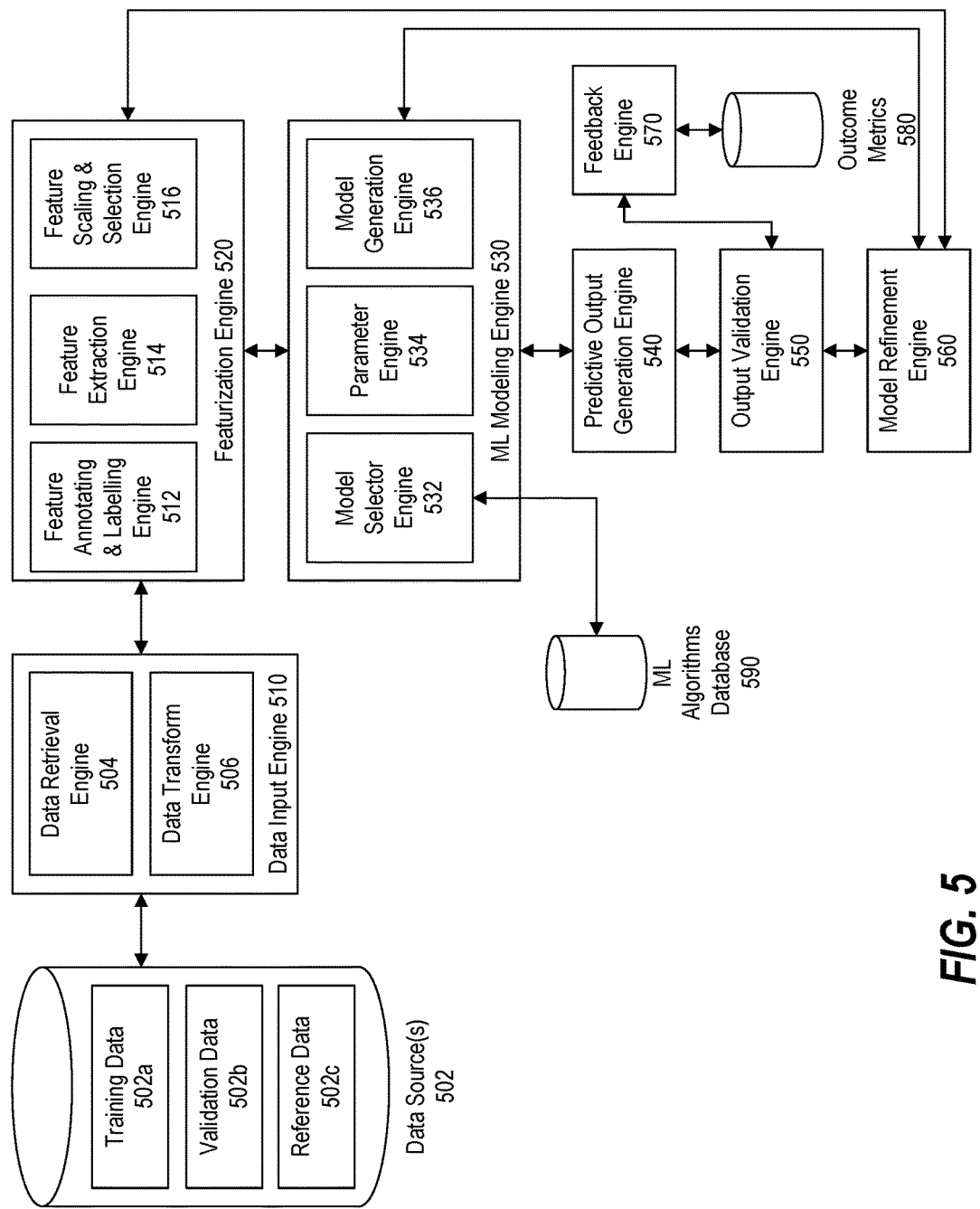
FIG. 5 is a block diagram illustrating an exemplary machine learning platform for implementing various aspects of this disclosure, according to some embodiments of the present disclosure.

FIG. 5 is a block diagram illustrating an exemplary machine learning platform for implementing various aspects of this disclosure, according to some embodiments of the present disclosure.

System 500 may include data input engine 510 that can further include data retrieval engine 504 and data transform engine 506. Data retrieval engine 504 may be configured to access, access, interpret, request, or receive data, which may be adjusted, reformatted, or changed (e.g., to be interpretable by other engine, such as data input engine 510). For example, data retrieval engine 504 may request data from a remote source using an API. Data input engine 510 may be configured to access, interpret, request, format, re-format, or receive input data from data source(s) 502. For example, data input engine 510 may be configured to use data transform engine 506 to execute a re-configuration or other change to data, such as a data dimension reduction. Data source(s) 402 may exist at one or more memories 404 and/or data storages 408. In some embodiments, data source(s) 502 may be associated with a single entity (e.g., organization) or with multiple entities. Data source(s) 502 may include one or more of training data 502a (e.g., input data to feed a machine learning model as part of one or more training processes), validation data 502b (e.g., data against which at least one processor may compare model output with, such as to determine model output quality), and/or reference data 502c. In some embodiments, data input engine 510 can be implemented using at least one computing device (e.g., computing device 402). For example, data from data sources 502 can be obtained through one or more I/O devices and/or network interfaces. Further, the data may be stored (e.g., during execution of one or more operations) in a suitable storage or system memory. Data input engine 510 may also be configured to interact with data storage 408, which may be implemented on a computing device that stores data in storage or system memory. System 500 may include featurization engine 520. Featurization engine 520 may include feature annotating & labeling engine 512 (e.g., configured to annotate or label features from a model or data, which may be extracted by feature extraction engine 514), feature extraction engine 514 (e.g., configured to extract one or more features from a model or data), and/or feature scaling and selection engine 516. Feature scaling and selection engine 516 may be configured to determine, select, limit, constrain, concatenate, or define features (e.g., AI features) for use with AI models. System 500 may also include machine learning (ML) modeling engine 530, which may be configured to execute one or more operations on a machine learning model (e.g., model training, model re-configuration, model validation, model testing), such as those described in the processes described herein. For example ML modeling engine 530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 502a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 530 may include model selector engine 532 (e.g., configured to select a model from among a plurality of models, such as based on input data), parameter selector engine 534 (e.g., configured to add, remove, and/or change one or more parameters of a model), and/or model generation engine 536 (e.g., configured to generate one or more machine learning models, such as according to model input data, model output data, comparison data, and/or validation data). Similar to data input engine 510, featurization engine 520 can be implemented on a computing device. In some embodiments, model selector engine 532 may be configured to receive input and/or transmit output to ML algorithms database 590 (e.g., a data storage 408). Similarly, featurization engine 520 can utilize storage or system memory for storing data and can utilize one or more I/O devices or network interfaces for transmitting or receiving data. ML algorithms database 590 (or other data storage 408) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 500 may further include predictive output generation engine 540, output validation engine 550 (e.g., configured to apply validation data to machine learning model output), feedback engine 570 (e.g., configured to apply feedback from a user and/or machine to a model), and model refinement engine 560 (e.g., configured to update or re-configure a model). In some embodiments, feedback engine 570 may receive input and/or transmit output (e.g., output from a trained, partially trained, or untrained model) to outcome metrics database 580. Outcome metrics database 580 may be configured to store output from one or more models, and may also be configured to associate output with one or more models. In some embodiments, outcome metrics database 580, or other device (e.g., model refinement engine 560 or feedback engine 570) may be configured to correlate output, detect trends in output data, and/or infer a change to input or model parameters to cause a particular model output or type of model output. In some embodiments, model refinement engine 560 may receive output from predictive output generation engine 540 or output validation engine 550. In some embodiments, model refinement engine 560 may transmit the received output to featurization engine 520 or ML modelling engine 530 in one or more iterative cycles.

Any or each engine of system 500 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 500 may be split across multiple computing devices to allow for distributed processing of the data, which may improve output speed and reduce computational load on individual devices. In some embodiments, system 500 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 500 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method for integrating an application programming interface (API) using a natural language model, the method comprising:
   receiving a registration of an external API via an interface connected to a system comprising the natural language model, the natural language model being trained to integrate a plurality of external APIs;
   accessing validating a manifest file hosted at a first online location by a publisher of the external API, the first online location being a location external to the system, the manifest file comprising:
   parameters for interfacing with the external API, and
   a second online location of a specification associated with the external API,
   the parameters and second online location being defined by the publisher of the external API;
   wherein validating the manifest file comprises determining that a Uniform Resource Locator (URL) containing the specification is hosted at the same level or a subdomain of a root domain associated with the external API;
   accessing the validated manifest file;
   accessing the specification at the second online location;
   receiving server definition code from the publisher of the external API;
   generating, using the system, a description for establishing a connection with the external API, the description comprising information of the parameters for interfacing with the external API and information from the specification, the description being generated, in part, by translating the server definition code, the translating comprising parsing the server definition code and extracting parameters using the natural language model; and
   integrating the external API with the natural language model based on the generated description for the external API, wherein the description is distinct from the specification.

2. The method of claim 1, wherein:
   the manifest file comprises authentication data;
   integrating the external API based on the description of the external API comprises injecting the description in a communication to the natural language model; and
   integrating the external API is performed after generating the description.

3. The method of claim 1, wherein:
   the specification identifies at least one endpoint associated with the external API;
   the second location is hosted by a third-party publisher; and
   translating comprises identifying methods associated with API endpoints and routes and extracting validation logic and metadata from the server definition code.

4. The method of claim 1, wherein the external API is a third-party software API that provides access to data or functionality not natively available within the interface or the natural language model.

5. The method of claim 1, further comprising accessing updated data within the manifest file, the updated data reflecting changes made by the publisher of the external API.

6. The method of claim 5, further comprising receiving a re-registration of the external API via the interface based on the updated data.

7. The method of claim 1, wherein the specification comprises natural language descriptions associated with the external API.

8. The method of claim 1, wherein receiving the registration of the external API comprises receiving authentication data associated with the external API via the interface.

9. The method of claim 1, wherein:
the system allows a the publisher of the external API to adjust the generated description; and
the method further comprises: after integrating the external API, accessing the external API based on input at the interface and receiving and processing an output comprising machine-readable data with the natural language model.

10. A system comprising:
at least one memory storing instructions;
at least one processor configured to execute the instructions to perform operations for integrating an application programming interface (API) using a natural language model, the operations comprising:
receiving a registration of an external API via an interface connected to the natural language model, the natural language model being trained to integrate a plurality of external APIs;
accessing validating a manifest file hosted at a first online location by a publisher of the external API, the first online location being a location external to the system, the manifest file comprising:
parameters for interfacing with the external API, and
a second online location of a specification associated with the external API,
the parameters and second online location being defined by the publisher of the external API;
wherein validating the manifest file comprises determining that a Uniform Resource Locator (URL) containing the specification is hosted at the same level or a subdomain of a root domain associated with the external API;
accessing the validated manifest file;
accessing the specification at the second online location;
receiving server definition code from the publisher of the external API;
generating a description for establishing a connection with the external API, the description comprising information of the parameters for interfacing with the external API and information from the specification, the description being generated by translating the server definition code, the translating comprising parsing the server definition code and extracting parameters using the natural language model; and
integrating the external API with the natural language model based on the generated description, wherein the description is distinct from the specification.

11. The system of claim 10, wherein:
the manifest file comprises authentication data; and
integrating the external API based on the description of the external API comprises injecting the description in a communication to the natural language model;
integrating the external API is performed after generating the description.

12. The system of claim 10, wherein:
the specification identifies at least one endpoint associated with the external API;
the second location is hosted by a third-party publisher; and
translating comprises identifying methods associated with API endpoints and routes and extracting validation logic and metadata from the server definition code.

13. The system of claim 10, wherein the external API is a third-party software API that provides access to data or functionality not natively available within the interface or natural language model.

14. The system of claim 10, the operations further comprising accessing updated data within the manifest file or the specification, the updated data reflecting changes made by the publisher of the external API.

15. The system of claim 14, the operations further comprising receiving a re-registration of the external API via the interface based on the updated data.

16. The system of claim 10, wherein the specification comprises natural language descriptions associated with the external API.

17. The system of claim 10, wherein:
translating parameters using the natural language model comprises identifying methods associated with API endpoints and routes and extracting validation logic and metadata from the server definition code; and
the system is configurable to receive adjustments to the generated description via the interface.

18. A computer networking apparatus comprising:
one or more memory devices;
one or more network devices; and
one or more processors connected to the one or more memory devices and the one or more network devices, wherein the one or more processors are configured to:
receive a registration via an interface connected to a natural language model, the natural language model being trained to integrate external APIs, the registration comprising a natural language input;
identify an external API by parsing the natural language input;
validate a manifest file hosted at a first online location by a publisher of the external API, the first online location being a location external to computer networking apparatus, the manifest file comprising:
parameters for interfacing with the external API, and
a second online location of a specification associated with the external API;
wherein validating the manifest file comprises determining that a Uniform Resource Locator (URL) containing the specification is hosted at the same level or a subdomain of a root domain associated with the external API;
access the validated manifest file;
access the specification at the second online location;
receive server definition code from the publisher of the external API; and
generate, at the computer networking apparatus, a description for connecting the external API, the description comprising information in the manifest file; and information from the specification, the description being generated by translating the server definition code, the translating comprising parsing the server definition code and extracting parameters using the natural language model; and
integrate the external API with the natural language model based on the description for the external API, wherein the description is distinct from the specification.

19. A computer-implemented method for integrating an application programming interface (API) using a natural language model, the method comprising:

receiving a registration of an external API via an interface connected to a system comprising the natural language model, the natural language model being trained to integrate a plurality of external APIs;

validating a manifest file hosted at a first online location by a publisher of the external API, the first online location being a location external to the system, the manifest file comprising:

parameters for interfacing with the external API, and a second online location of the specification associated with the external API, the parameters and second online location being defined by the publisher of the external API;

wherein validating the manifest file comprises determining that a Uniform Resource Locator (URL) containing the specification is hosted at the same level or a subdomain of a root domain associated with the external API;

accessing the validated manifest file;

accessing the specification at the second online location;

receiving server definition code from the publisher of the external API;

generating, using the system, a description for establishing a connection with the external API; and integrating the external API with the natural language model based on the generated description for the external API, wherein the description is distinct from the specification.

* * * * *